United States Patent [19]

Austin

[11] 4,251,221

[45] Feb. 17, 1981

[54] METHOD AND APPARATUS FOR FINE-TUNING IN CARBON BLACK PRODUCTION

[75] Inventor: Oliver K. Austin, Bartlesville, Okla.

[73] Assignee: Phillips Petroleum Company, Bartlesville, Okla.

[21] Appl. No.: 43,872

[22] Filed: May 30, 1979

[51] Int. Cl.³ .............................................. C09C 1/48
[52] U.S. Cl. .................................. 23/230 A; 422/62; 422/150; 422/151; 423/450; 423/DIG. 5
[58] Field of Search ............. 23/230 A; 422/150, 156, 422/62; 423/450, DIG. 5

[56] References Cited

U.S. PATENT DOCUMENTS

| | | | |
|---|---|---|---|
| 2,368,827 | 2/1945 | Hanson et al. ....................... | 422/156 |
| 2,641,534 | 6/1953 | Krejci . | |
| 3,681,031 | 8/1972 | Johnson . | |
| 4,030,889 | 6/1977 | Gunnell ................................ | 423/456 |
| 4,069,413 | 1/1978 | Rutledge et al. .................. | 23/230 A |
| 4,093,705 | 6/1978 | Kraus et al. ...................... | 23/230 A |

Primary Examiner—R. E. Serwin

[57] ABSTRACT

A method and apparatus for producing carbon black under fine-tuned conditions which comprises measuring a property of the black produced in a tangential introduction of hot gases to produce a vortex operation and adjusting introduction of the hot gases and/or the make oil or gas responsive to said property until it has a desired value. In one embodiment, the adjustment is made manually. In another embodiment, it can be made by a computerized operation. The point of introduction of hot gases can be adjusted by providing at least one movable orifice-carrying element in the conduit supplying the hot combustion gases. The discharge end of the make oil or gas supply pipe can also be relocated according to the measured property.

20 Claims, 7 Drawing Figures

METHOD AND APPARATUS FOR FINE-TUNING IN CARBON BLACK PRODUCTION

BRIEF SUMMARY OF THE INVENTION

The invention provides method and means for fine-tuning carbon black production to make carbon black having a desired property. In one embodiment the point of introduction of, say, heating medium with which a make oil or gas is converted to carbon black, is adjusted responsive to a determined or measured property of the carbon black being produced until that property has a desired value. Similarly, the point or manner of introduction of make oil or make gas wherewith to produce carbon black can be or is adjusted, separately or simultaneously, responsive to a determined value of a property of the carbon black being produced until a desired value for said property or optimum value, as the case may be, is obtained. The adjustment or positioning or repositioning of the precise point of entry of the heating medium or hot gases wherewith to produce carbon black and/or the varying or positioning or repositioning of the precise point of entry of the make oil or make gas for the production of carbon black can be accomplished manually or employing automatic means. A computer having stored in its memory information related to properties of produced carbon blacks and to various heating media and/or various make oils or make gases, can be employed for automated operation.

Figure 1:
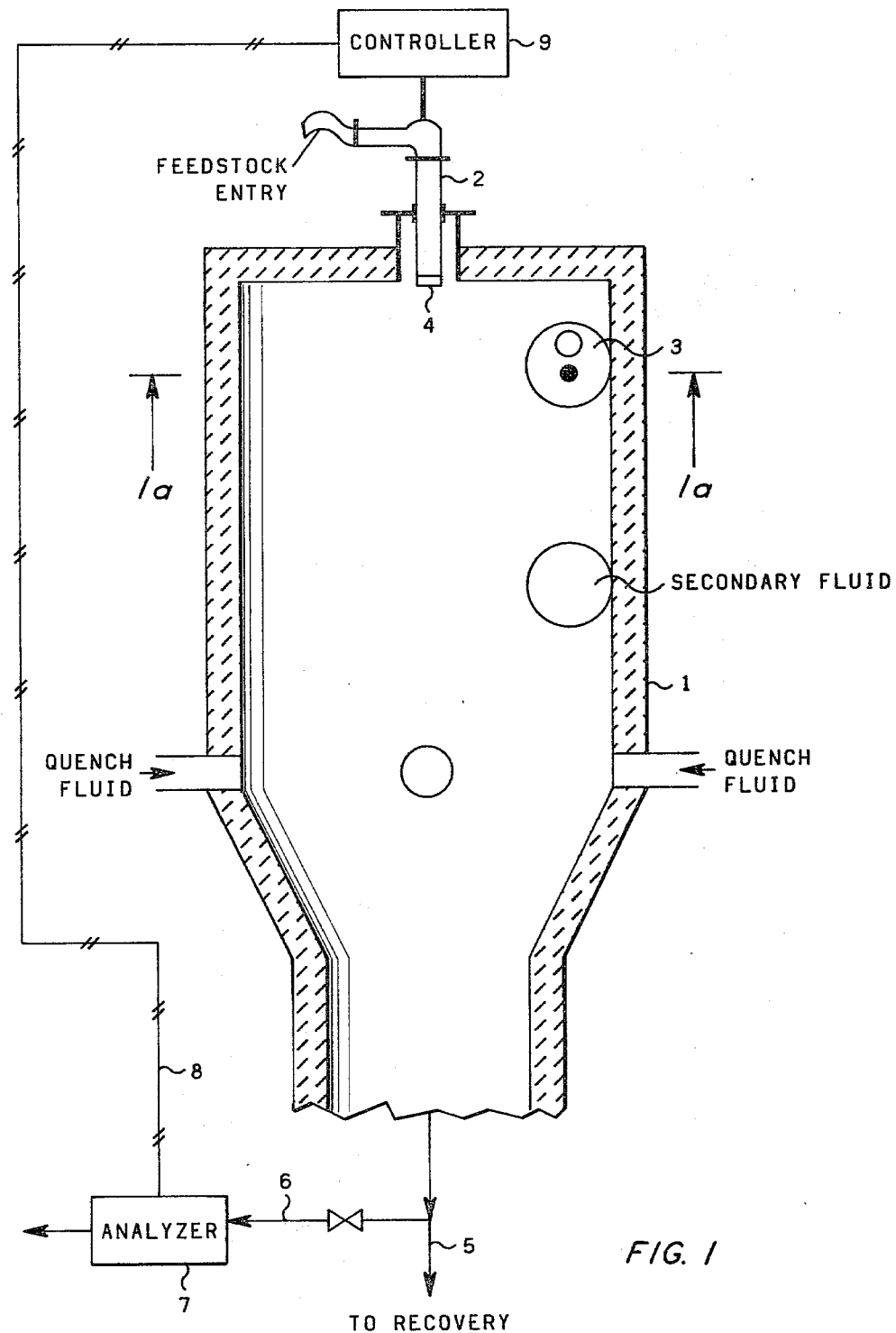
In FIG. 1 as shown a vertical type reactor to which can be applied, advantageously, the several concepts of the present invention.

The drawings are schematic or diagrammatic and one skilled in the art in possession of this disclosure having studied the same will recognize that in actual practice there may be more than one orifice or hot medium supplying pipe or fuel supplying pipe. Also, while two tunnels have been shown tangentially disposed a different number and different disposition might well be effected.

The disclosures of the following patents are incorporated herein by this reference to them. U.S. Pat. No. 3,560,164 issued Feb. 2, 1971, Charles R. Venable, Jr.; 2,641,534 issued June 9, 1953, J. C. Krejci; 3,681,031 issued Aug. 1, 1972, P. H. Johnson; 4,030,889 issued June 29, 1977, Thomas J. Gunnell; and 4,093,705 issued June 6, 1978, Gerard Krous, Carl J. Stacy, Paul J. Chang.

The above-mentioned patents are to a real extent representative of the carbon black producing art.

U.S. Pat. No. 4,093,705 is of particular interest in that it shows a measuring of the value of a property of carbon black which is applicable to the present invention. The actual measuring of the property of a carbon black produced by the present invention can be accomplished by any known or hereafter discovered method or means.

DETAILED DESCRIPTION

The present invention relates to the production of carbon black. In one of its aspects it relates to a method for producing carbon black having at least one certain desired property. In another of its aspects the invention relates to an apparatus or means for producing a carbon black having at least one measured certain value or property. In a more specific aspect of the invention it relates to the controlled or fine-tuned production of carbon black by a manual or automated operation and/or device.

In one of its concepts the invention provides, in the operation of a furnace carbon black producing method the steps of measuring or determining the value of a property of the carbon black produced, and depending upon the value obtained, adjusting positioning or repositioning the point, or points, of introduction of hot medium into the overall carbon black producing zone, principally to create in said zone a desired vortex of gases into which a make oil or make gas is introduced to produce carbon black therein. In another of its concepts the invention provides an apparatus, more fully described herein, comprising means for adjusting the flow of hot medium for producing carbon black upon admixture with a make oil or make gas to a locus or point selected depending upon a measured or determined value of a property of the carbon black produced. In a further concept of the invention it provides for the adjusting, positioning or repositioning of the point, or points, to which the make gas and/or make oil is introduced this being effected responsive to said determined value of said property either separately, before or after or simultaneously together with the adjusting, positioning or repositioning of the point of introduction of the hot medium, responsive to said value of said measured property, or responsive to the value of a different measured property.

In a specific embodiment of the invention the concept includes a positioning within the usual hot combustion gas or hot air supplying tunnel of a means or adjustable member which but for at least one orifice therein substantially blocks flow of the gases or air in said tunnel, said means being adjustable by motion along the access of the tunnel and/or rotatable therein.

It is an object of this invention to provide a method for producing carbon black. It is another object of this invention to provide an apparatus for producing carbon black. It is a further object of this invention to provide a method for fine-tuning of a carbon black producing operation. It is still a further object of the invention to provide an apparatus in which carbon black can be produced under fine-tuned operation conditions. It is another object of the invention to fine-tune a carbon black operation or apparatus to obtain a desired structure and to maintain said structure during operation of the carbon black producing unit.

Other aspects, concepts, and several advantages of the invention are apparent from a study of this disclosure and the drawings.

According to the present invention, there is provided an improved operation of a carbon black producing process which comprises introducing into a locus at one end of a furnace carbon black producing zone at least one of a hot combustion gas producing material, a hot combustion gas, and hot air, in a manner to create a vortex of gases in said zone proceeding from said end of said zone toward the other end of said zone while there is introduced into said vortex of gases a make oil or gas wherewith to produce carbon black, producing said carbon black, determining at least one property of said carbon black and suitably repositioning the locus of introduction of said combustion gas producing material, said hot combustion gas and/or said hot air.

Also, according to the present invention, there is provided an improved operation of a carbon black producing process which comprises introducing into a vortex of gases in a carbon black producing unit or furnace at least one of a carbon black make gas and a carbon black make oil, producing carbon black, determining at least one property of said carbon black and suitably repositioning the point of introduction of said make gas and/or said carbon black make oil responsive to the value of the determined property until said determined property of said carbon black has a desired value.

Figure 1A:
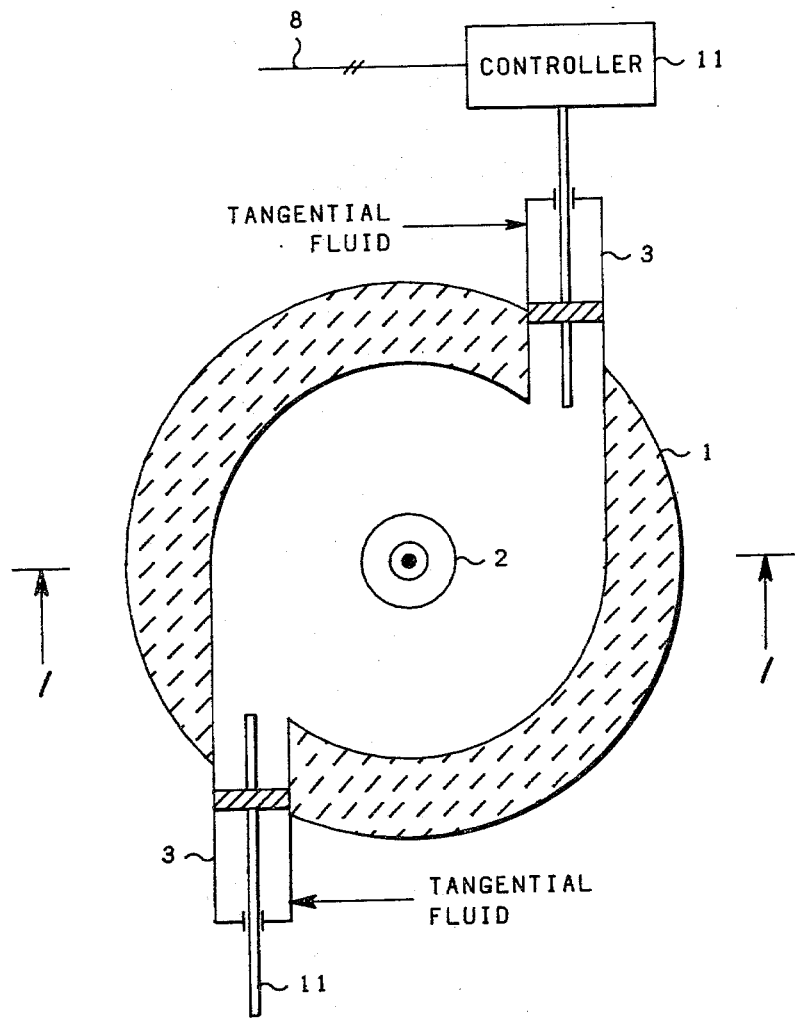

Referring now to FIG. 1 and FIG. 1a there is shown a carbon black furnace or reactor 1 having make hydrocarbon inlet 2 and tangential inlet ports or tunnels 3.

The make hydrocarbon is introduced at 4 through a suitable nozzle or pipe, here shown in simplified manner. Produced carbon black leaves the reactor at 5 for further processing, not shown for sake of simplicity. A small stream of the carbon black (carbon black in gases) is passed by 6 to analyzer 7 which, in the instance described, measures structure of the carbon black, as can be accomplished in U.S. Pat. No. 4,093,705, above identified further. A signal indicative of structure of the produced carbon black is passed by 8 to controller 9 which controls or positions or readjusts the position of pipe 2, as more fully described herein.

Figure 2:
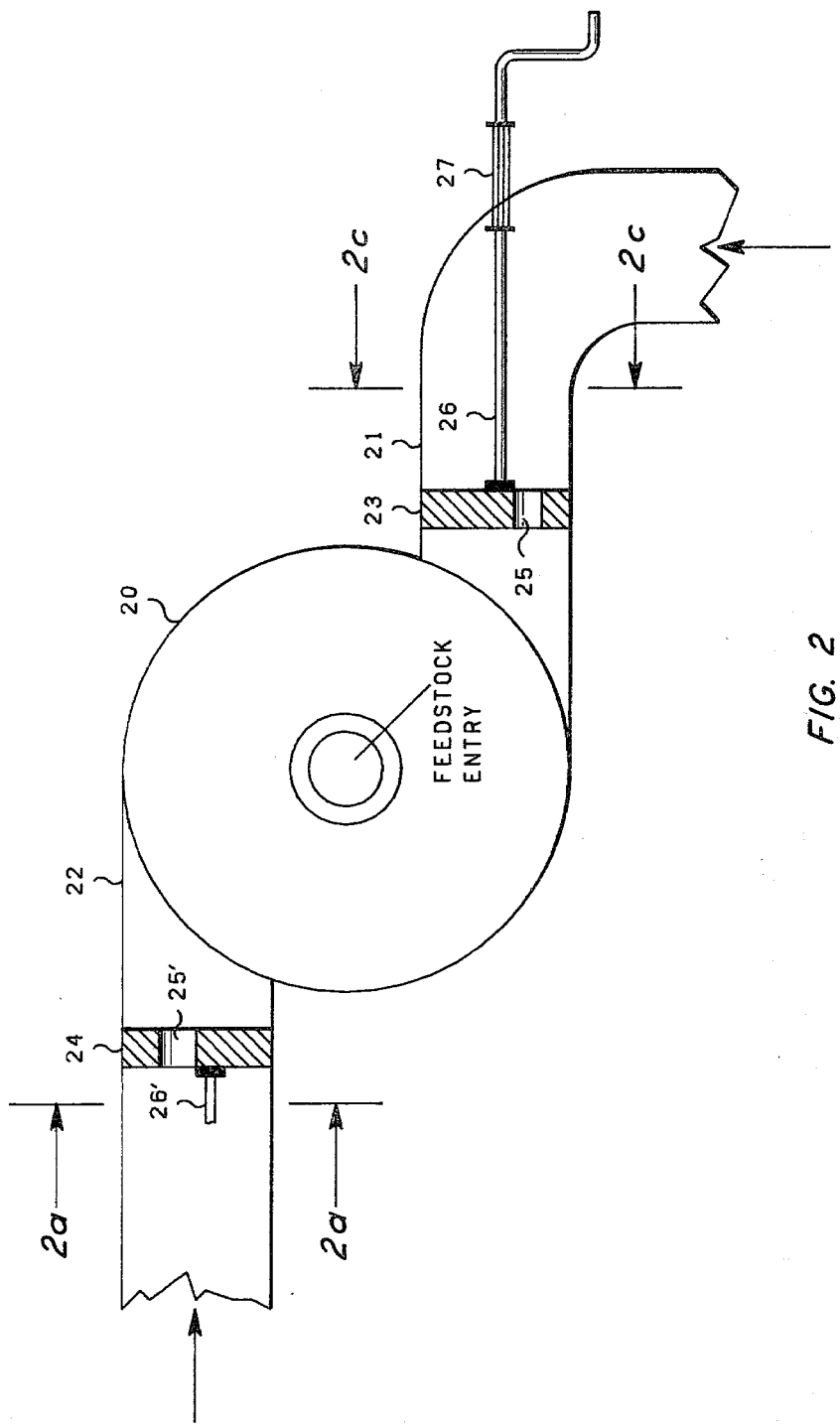
FIG. 2 diagrammatically shows a cross sectional view taken through the precombustion section and hot gas or hot air carrying tunnels, the view being taken at right angles to the axis of the overall carbon black furnace. The embodiment of the invention shown is that in which an orifice carrying ceramic or stainless steel or ceramic-faced steel, member, plate, disc or plug is rotatably mounted within the tunnel together with means for moving the member axially in the tunnel and/or rotating same.

Referring now to FIG. 1a, in lieu of adjustment of pipe 2, or at the same time this pipe 2 is adjusted, or prior to or following on its adjustment, a signal 8 from analyzer 7 is passed to the hot gas inlet adjustor mechanism 11, more fully shown in FIG. 2.

Referring now to FIG. 2, there is shown the precombustion section 20 of a carbon black producing furnace (as viewed toward the feedstock entry) having tangential tunnels 21 and 22 for injection of hot combustion gases or heated air wherein are mounted both slideably and rotatably elements 23 and 24 having apertures 25 and 25' therein, respectively. For manual operation there are positioning crank means 26 and 26', means 26 shown mounted in tube 27, as illustrated in only tunnel 21. By rotating crank 26 or pushing or pulling the same the disk 23 can be adjusted to any desired position. This will move the orifice 25 so that the entry of hot gas or hot air can be controlled to obtain variation in the measured value of any given property of the carbon black.

One skilled in the art in the possession of this disclosure having studied the same will recognize that considerable modification can be made of the equipment here shown diagrammatically. Also, one will recognize that variation even in the concept of the specific method and/or means of directing the flow to a certain desired position can be made readily. It is within the scope of the claimed invention to have more than one orifice and to have orifices of different sizes and even configurations. A disk now contemplated, helpful to disclose here, is one in which there are at least two orifices. A principal orifice and a smaller or flow-modifying or tailoring flow wherewith to modify the physical flow characteristics of the hot gas or air emanating through the principal orifice.

Figure 2A:
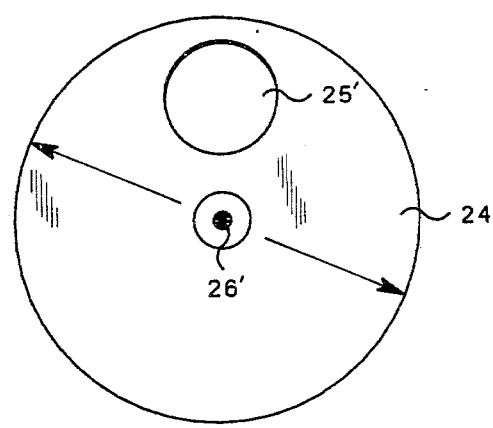
FIGS. 2a, 2b and 2c illustrate various positions of the orifice in said member.
Figure 2B:
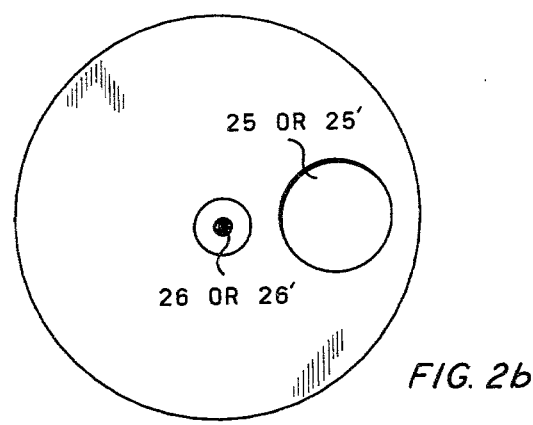
Figure 2C:
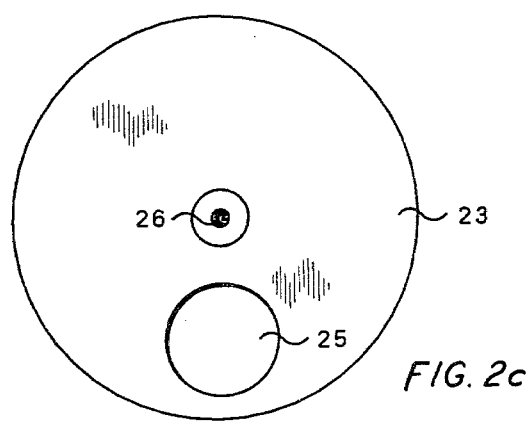

FIGS. 2a, 2b and 2c (2a and 2c, viewed by 2a—2a and 2c—2c, respectively, on FIG. 2) diagrammatically show different positions of the orifices and with reference to FIG. 2, as described, show positions of high vortex strength, intermediate vortex strength, and low vortex strength, respectively, and which now are believed to apply to production of low structure, intermediate and high structure blacks, respectively.

Figure 3:
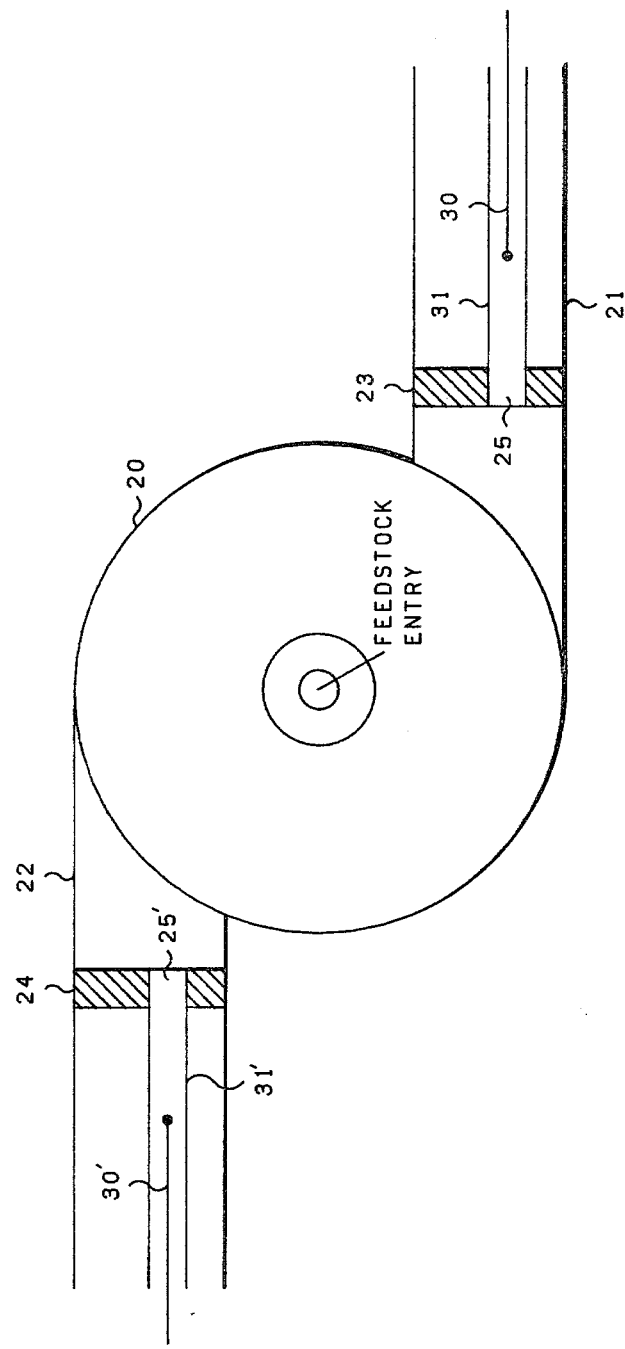
FIG. 3 shows a modification of FIG. 2 in which in addition to air there is being introduced fuel, conveniently but not necessarily into the same pipe and through the same orifice carried in said member.

Referring now to FIG. 3, there is shown additionally to the elements of FIG. 2 fuel inlet pipes 30 and 30', positioned in air injection pipes 31 and 31', respectively. These pipes can be utilized to make the sole adjustments according to the invention. That is, for fine tuning of the operation, e.g. pipe 30 alone may be the one moved slideably to and fro within air injection pipe 31 which terminates at the orifice 25. Thus, when disk 23 has been suitably positioned, further tuning of the operation can be accomplished simply by sliding pipe 30 to and fro within pipe 31 or putting it in any desired posture within pipe 31. Orifice 25 is shown at high vortex strength position, orifice 25' at low vortex strength position.

The following information is given by way of more full description of the invention to one skilled in the art.

The disk is mounted in the tangential tunnel (usually two tunnels 180 degrees apart are used), and the disk can be rotated along the longitudinal axis of the tunnel to position the orifice at various radial distances from the axial centerline of the reactor.

When the orifice is at a "maximum" radius, maximum vortex flow is effected, producing lowest "structured", e.g. DBP value black. (By ASTM D 3493-76 or D 2414-76)

When the orifice is at a "minimum" radius, minimum vortex flow is effected, producing highest "structured" black.

At an intermediate radius position for the orifice, intermediate "structured" black is produced.

Various "soft blacks", e.g. (ASTM D 1765-76) ASTM types N 774, N 762, N 660, N 550, and N 765 are made in the same apparatus, made one type at a time. Further information is available in ASTM Standards on Carbon Black, July 1976.

In the past, the preheated tangential air (no fuel is used normally in making the so-called "soft blacks") was added at one fixed tangential locus. The amount of air used for different blacks was changed on some, but there was no way to otherwise change the vortex strength of the tangential gases. Prior practice chose an "average" tangential vortex strength which, for example, for N 774 and N 762 was too low of vortex strength (since high vortex strength is desired to make low structure black and the structure values of N 774 and N 762 were too close to customers' specifications). Structure values were at times above the upper maximum structure specified, and a structure decreasing material, e.g. a potassium compound, had to be added to the reactor to decrease these structure values. Such additives are costly and add to production of undesired "grit".

The invention allows, with its rotatable disk and eccentric air entry, for such as N 774 and 762, to rotate the disk to "maximum" radius to effect "maximum" vortex strength which produces the lowest structure value for the black. Structure additive use, therefore, can be eliminated or substantially reduced, reducing the undesirable grit formation now found and cost of the process.

Similarly, but oppositely, blacks such as N 550 and N 765 made in this same prior operation apparatus had structures that crowded the lower end of specifications for structure. Low vortex strength is desired for these blacks to effect high structure. The invention accomplishes the needed low vortex strength by rotating the disk so that the air entry orifice is at the "minimum" radius position, which effects lowest vortex strength and highest structure.

In some operations, an intermediate vortex strength is needed for intermediate structure values.

| | ASTM Type Carbon Blacks | | | | |
|---|---|---|---|---|---|
| | N 774 | N 762 | N 660 | N 550 | N 765 |
| Customer's Ranges, DBP,$^a$ | 68.5-78.5 | 60-70 | 85-100 | 115-126 | 116-128 |
| Actual DBP w/o K$^+$ Added | 116 | 116 | 116 | 121 | 116 |
| DBP w/K$^+$ Added wt. ppm of oil, | 300 | 300 | 300 | none | none |
| Final DBP w/K$^+$ Added, | 70 | 62 | 93 | (121)$^b$ | (116)$^c$ |
| Estimated K$^+$ w/invention wt. ppm, | 150 | 150 | 150 | none | none |
| Vortex Strength of Invention, | High | High | High | Low | Low |
| Estimated DBP Invention, | 73$^d$ | 65$^d$ | 93$^d$ | 120 | 122 |

$^a$ASTM D 2414-76 (cc/100 gm - DBP);
$^b$No potassium for N 550;
$^c$No potassium for N 765. DBP has run as low as 111 (off specification);
$^d$With 150 ppm K$^+$ by wt. of oil.

The prior operations of N 774, N 762, and N 660 require high additive (e.g. potassium compound) content (causes grit) to make the low DBP value. By use of the high vortex of the invention, it is estimated that 40 to 50 percent as much K$^+$ will be needed to make DBP specification.

N 765 cannot of course use K$^+$, but conventionally the DBP is too close to the lower end of the Customers' Ranges. It is estimated that using the low vortex of the invention that the DBP value will be about 122 for N 765.

Typical feed materials for "soft carbon blacks" will be 115-130 BMCI (Bureau of Mines Correlation Index) and typically a BMCI of 125. Saybolt Universal Seconds viscosity at 210° F. will usually be about 65 to 75, usually about 70.

Fuel gas or liquid is used in making hard blacks (N 110, N 220, N 330, etc.). The invention has been expanded to include such "O-reactors", as in U.S. Pat. No. 2,564,700, and Venturi reactors.

Usually atomizing gas, e.g. air and/or steam is used on the bifluid conventional feed nozzle, at about 10 SCF of gas per gallon of oil.

| Typical Air and Feed Rates (See FIG. 3) | | | | | |
|---|---|---|---|---|---|
| | N 774 | N 762 | N 660 | N 550 | N 765 |
| Tangential Air SCF/hr | 150,000 | 150,000 | 200,000 | 200,000 | 15,000 |
| Temperature, °F. | 600 | 600 | 600 | 600 | 600 |
| Feed Oil, gal/hr. | 450 | 425 | 480 | 450 | 460 |
| Temperature, °F. | 350 | 350 | 350 | 350 | 350 |

The structure of the analyzer 7 and/or the structure of control mechanism 9 which is responsive to signal from analyzer 7 do not form a part of the claimed invention. One skilled in the art in possession of this disclosure having studied the same can devise or will devise embodiments of the invention having different kinds of analyzers or controls. However, presently, the analyzer of U.S. Pat. No. 4,093,705 is preferred. The controller responsive to the signal obtained from the analyzer can be by hand. In both the cases of the control of the flow of heating medium in the tunnels and the flow of make hydrocarbon it can be seen that any mechanic ordinarilly skilled in the art can devise apparatus for manually or automatically moving the points of introduction by moving the equipment or structure through which the introductions are effected.

The positions of the respective introductions can be determined by one skilled in the art in possession of this disclosure having studied the same. Such determinations will involve only skill in the art including the determination of the value of the property of the carbon black and position all positions of introduction corresponding thereto.

Typically, but not limiting, the diameters of the precombustion zone 20, tangential tunnels 21 and 22, and orifices 25 and 25' can be as follows: precombustion zone 20, about 24 inches to about 32 inches, tunnels 21 and 22, about 40 to about 60 percent of the diameter of the precombustion zone 20; and orifices 25 and 25', about 30 to about 50 percent of the diameter of the tunnels 21 and 22.

Reasonable variation and modification are possible within the scope of the foregoing disclosure, drawing, and the appended claims to the invention, the essence of which is that there have been set forth a method and apparatus for producing a carbon black under fine-tuned conditions wherein responsive to a measured property of the carbon black produced the introduction of at least one of the heating medium and the make hydrocarbon is adjusted, positioned or repositioned substantially as described.

I claim:

1. The operation of a furnace carbon black producing process which comprises introductions as follow: Introducing tangentially into a locus at one end of a furnace carbon black producing zone at least one of a hot combustion gas producing material, a hot combustion gas, and hot air, in a manner to create a vortex of gases in said zone proceeding from said end of said zone toward the other end of said zone; introducing at another locus at said one end of said zone substantially into the axis of said vortex of gases formed therein at least one of a carbon black make gas and a carbon black make oil, producing carbon black, determining at least one property of said carbon black and suitably repositioning at least one of said introductions responsive to the value of the determined property until said determined property of said carbon black has a desired value.

2. An operation according to claim 1 wherein at least one of said material, combustion gas and hot air is introduced into a precombustion section at said one end of said carbon black producing zone.

3. An operation according to claim 2 wherein the repositioning involves adjusting the distance of the introduction point from the tangency of said introduction section and said precombustion section along the longitudinal axis of said introduction section, said longitudinal axis of said introduction section being at an angle to said longitudinal axis of said carbon black producing zone and/or repositioning said introduction point radially with respect to said longitudinal axis of said introduction section.

4. An operation according to claim 3 wherein said introduction section is at an angle to the longitudinal axis of said carbon black producing zone and wherein said repositioning involves at least one of adjusting within said introduction section the distance of said introduction from said longitundinal axis of said carbon black producing zone and the position of said introduction rotationally about the longitudinal axis of said introduction section.

5. An operation according to claim 4 wherein the precombustion section of the carbon black producing zone is substantially coaxially arranged at said one end of said carbon black producing zone and has a radius larger than the remainder of said carbon black producing zone.

6. An operation according to claim 5 wherein at least one introduction section is arranged with a longitudinal axis flowline substantially at a right angle to the longitudinal axis of said carbon black producing zone.

7. A furnace carbon black producing apparatus which comprises at one end thereof a precombustion zone, means for introducing tangentially into said precombustion zone a heating medium under conditions to convert to carbon black in said apparatus a feed convertible under carbon black producing conditions, means responsive to the value of a determined property of carbon black produced in said apparatus operatively associated with said precombustion zone to vary the position of said means for introducing heating medium into said precombustion zone; and means for transducing said value to said means to vary the position of said means for introducing heating medium so as to produce a carbon black having a desired value of said property.

8. An apparatus according to claim 7 comprising means associated with said precombustion zone for introducing a make oil or gas into said precombustion zone, means for varying the position of said means for introducing make oil or gas and means for transducing said value to said means for varying the position of said means for introducing.

9. A carbon black producing furnace according to claim 7 comprising an elongated carbon black producing zone, a precombustion section substantially longitudinally axially aligned with said carbon black producing zone and having a diameter running substantially at a right angle through the longitudinal axis of said carbon black producing zone and precombustion section, at least one hot combustion medium supplying tunnel in open communication with said precombustion section at a peripheral locus thereof and at a distance from the longitudinal axis of said carbon black producing zone and said precombustion section, and means within said tunnel comprising therein at least one movable orifice-carrying element, permitting flow in said tunnel only through said orifice, for adjusting the locus of introduction of said hot combustion medium into said tunnel at the end of said tunnel which is in open communication with said precombustion section.

10. A furnace according to claim 9 wherein the orifice-carrying element is a movable disk or plug having at least one orifice therein.

11. A furnace according to claim 10 wherein at least one conduit is comprised in at least one orifice in said disk for carrying at least one hot medium into said tunnel for discharge into said precombustion section.

12. An apparatus according to claim 11 wherein a further conduit is disposed within said one conduit for separately supplying, say, air in the annulus thus arranged and fuels through said further conduit.

13. An apparatus according to claim 10 wherein said disk or plug is rotatable about and/or movable within said tunnel on the longitudinal axis of said tunnel.

14. A carbon black producing apparatus comprising a precombustion section, at least one heating medium supplying tunnel in open communication with said precombustion section and adjustable means within said tunnel to direct the flow of heating medium into said tunnel at a selected point adjacent to the open communication locus.

15. An apparatus according to claim 14 wherein there is comprised within said tunnel a rotatable disk or plug blocking flow of heating medium into said tunnel, and said disk or plug has at least one orifice therein through which heating medium can flow.

16. An apparatus according to claim 15 wherein said disk is adjustable along the longitudinal axis of said tunnel.

17. An apparatus according to claim 15 wherein said disk or plug is adapted to and does carry at least one pipe within said orifice for a flow of heating medium into said tunnel at said open communication locus.

18. An apparatus according to claim 17 wherein there is located within said pipe a further pipe forming an annulus and means are provided for flowing hot combustion gas or air through said annulus and fuel through said further pipe.

19. An apparatus for producing carbon black comprising in combination, a carbon black producing furnace, means for introducing hot gases into said furnace to produce a vortex of gas therein, means for introducing a make hydrocarbon into said vortex of gases, means for determining the value of a property of said carbon black and means responsive to said value to adjust or reposition said means for introducing said hydrocarbon into said vortex of gases.

20. An apparatus for producing carbon black comprising in combination, a carbon black producing furnace, means for introducing hot gases into said furnace to create a vortex of gases therein, means for introducing a make hydrocarbon into said vortex of gases, means for determining the value of a property of said carbon black and means responsive to said determined value to adjust or reposition said means for introducing said hot gases into said furnace responsive to said value.

* * * * *